United States Patent [19]
Rice et al.

[11] Patent Number: 6,011,832
[45] Date of Patent: Jan. 4, 2000

[54] MULTIPLE SERVICE ANNOUNCEMENT SYSTEM AND METHOD

[75] Inventors: Carol Ann Rice; Ronald Dale Crumpler, both of Springfield; John David Downey, Sherman, all of Ill.

[73] Assignee: Ameritech Corporation, Hoffman Estates, Ill.

[21] Appl. No.: 09/104,552

[22] Filed: Jun. 25, 1998

[51] Int. Cl.[7] .................................................. H04M 1/64
[52] U.S. Cl. ...................... 379/88.16; 379/71; 379/88.28
[58] Field of Search .................... 379/71, 88.16, 379/88.27, 88.28, 209, 201, 216, 88.22, 88.23, 88.24; 704/258, 278

[56] References Cited

U.S. PATENT DOCUMENTS

| | | | |
|---|---|---|---|
| 4,439,635 | 3/1984 | Theis et al. | 379/87 |
| 4,918,322 | 4/1990 | Winter et al. | 379/67.1 |
| 5,436,967 | 7/1995 | Hanson | 379/266 |
| 5,539,808 | 7/1996 | Inniss et al. | 379/88.22 |
| 5,664,060 | 9/1997 | Jarrett et al. | 704/278 |
| 5,724,406 | 3/1998 | Juster | 379/88.13 |
| 5,742,674 | 4/1998 | Jain et al. | 379/209 |
| 5,758,323 | 5/1998 | Case | 704/278 |
| 5,771,276 | 6/1998 | Wolf | 379/88.16 |
| 5,784,438 | 7/1998 | Martinez | 379/67.1 |
| 5,802,150 | 9/1998 | Beck et al. | 379/93.06 |

*Primary Examiner*—Scott Weaver
*Attorney, Agent, or Firm*—Bruce E. Stuckman; Robert P. Renke

[57] ABSTRACT

A method for providing multiple calling service announcements on a single circuit card within a telephone network. The method reduces the number of stored speech files necessary to generate announcements regarding a calling service such as Automatic Call Back or Enhanced Repeat Dial. By reducing the amount of speech data stored on a circuit card, multiple calling service announcements can be provided on a single circuit card, thereby reducing equipment costs.

12 Claims, 1 Drawing Sheet

MULTIPLE SERVICE ANNOUNCEMENT SYSTEM AND METHOD

TECHNICAL FIELD

The present invention relates to telephone communication systems and particularly to automatic announcement systems adapted to be connected to telephone lines to provide for such services as Automatic Call Back and Enhanced Repeat Dial.

BACKGROUND OF THE INVENTION

Various services have become available with the development of communications technology. For example, in a telephone system, there are many services in practical use such as call forwarding, Automatic Voice Messaging (AVM), Automatic Call Back (ACB), Enhanced Repeat Dial (ERD), and Abbreviated Dialing (AD). These services are typically presented to users by recorded announcements. Recorded announcements for such calling services are formed from spoken words, phrases, tones or periods of silence stored in separate speech files. In response to a request for such calling services, various speech files are accessed in a predetermined order to generate a complete announcement which is then presented to the caller.

Telecommunications equipment vendors support such calling services by providing multiple speech files on circuit cards along with a microprocessor controller for accessing the speech files and generating announcements. The circuit cards provide link access to the front end of a digital phone network switch. An example of such a circuit card is the NT1x80AA Enhanced Digital Recorded Announcement Machine (EDRAM) card manufactured by Northern Telecom.

Commercially available circuit cards have several shortcomings, however. The circuit cards typically have announcement fragments stored in several separate speech files. In a typical announcement, portions of the several speech files must be accessed to form a complete announcement. A telephone company seeking to implement a particular calling service must purchase all of the speech files, even though many of the fragments within the speech files do not support the desired calling feature. Furthermore, due to limited memory space on the circuit cards, the resources of an entire circuit card can be exhausted in a typical implementation of a single calling service. Thus, for each calling service implemented by a telephone company, a dedicated circuit card must be purchased. In some instances, a separate controller card must also be programmed to retrieve and assemble complete announcements from the available speech files on the circuit cards. Considering a large telephone company with many central offices, circuit cards represent a substantial equipment investment.

SUMMARY OF THE INVENTION

It is a general object of the present invention to reduce the number and thus the cost of circuit cards for a telephone system. It is another object of the present invention to provide more than one communication service on a single circuit card.

It is also an object of the present invention to provide a circuit card with audio segments unique to two separate communication services, as well as segments common to both services. It is still another object of the present invention to provide a single circuit card with audio segments necessary to compose announcements for both Automatic Call Back and Enhanced Repeat Dial services.

These and other objects and features of the present invention will become apparent when viewed in light of the detailed description of the preferred embodiment when taken in conjunction with the attached drawings and appended claims.

The present system is directed to an improved announcement delivery system which overcomes these and other disadvantages of previous calling service systems. The method provides more than one communication service on a single circuit card by defining the groups of audio segments necessary to compose a complete announcement of the first communication service such as ACB (Automatic Call Back) and the second communication service such as ERD (Enhanced Repeat Dial). Once the announcement fragments are defined, they are stored on a single circuit card. The circuit card is then programmed to deliver, in response to a user selection of either the first or second communication service, a complete announcement for the respective service composed from the audio segments stored on the circuit card.

For a more complete understanding of this invention, reference should be made to the embodiment illustrated in greater detail in the attached specification and accompanying drawings.

In particular, the present invention has a number of important advantages. Specifically, the present invention provides an improved method of providing multiple calling services on a single circuit card.

Another advantage of the present invention is saving recording time by eliminating unnecessary verbiage within the speech files forming the calling service announcements. A further advantage of the present invention is increased speech file storage by the elimination of unnecessary speech files for unsupported calling service announcements.

Another advantage of the present invention is improved maintenance of the overall system due to the reduced number of components. Still another advantage of the present invention is the reduction of equipment necessary to implement multiple calling services, including a reduced number of circuit cards and maintenance trunk module slots.

BEST MODES FOR CARRYING OUT THE INVENTION

Figure 1:
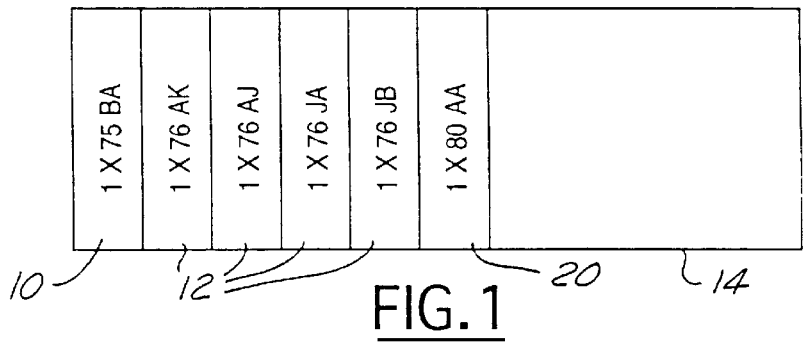
FIG. 1 is a block diagram representing a prior art method of implementing multiple calling services on circuit cards.

Referring now to the drawings, FIG. 1 shows a known method of providing multiple calling service announcements such as for Automatic Call Back (ACB) and Enhanced Repeat Dial (ERD). Digital recorded announcement hardware consists of a speech processor, a microprocessor controller, and speech memory. Using Northern Telecom's equipment, for example, the prior art implementation of more than one calling service, such as ACB and ERD, required a 1×75AA/BA controller card 10 and four additional EPROM cards 12. A NT1x80AA EDRAM card 20 was also required complete announcement. The controller card 10 can be programmed to select and retrieve the various phrases, tones and periods of silence from the speech memory of the EPROM cards.

The controller card 10, EPROM cards 12, and EDRAM card 20 each occupy a slot in the maintenance trunk module (MTM) shelf 14. In order to operate properly, however, the controller card 10, EDRAM card 20, and EPROM cards 12 must reside in the same MTM shelf 14. The MTM 14 contains slots for the circuit cards 10, 12 and 20. The circuit cards 10, 12, 20 provide link access to the front end of a digital telephone network switch. Because the controller card 10, EDRAM card 20, and the EPROM cards 12 must reside in the same MTM 14, the cards themselves and the space they occupy in the MTM 14 represent a significant equipment investment for a large regional telephone company.

Figure 2:
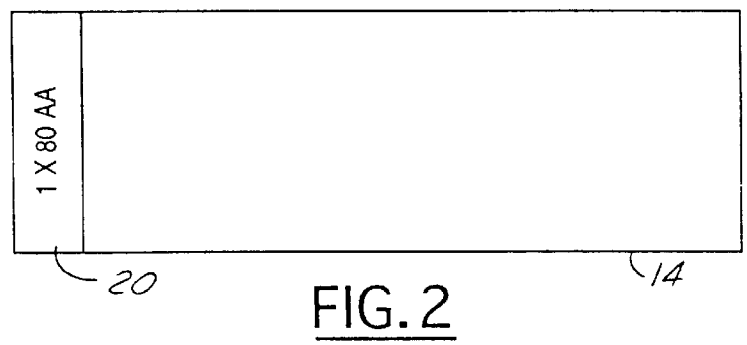
FIG. 2 is a block diagram representing a telecommunication system structured according to the present method of combining multiple calling services on a single circuit card; and, FIG. 3 is a flow diagram of the present method of implementing multiple calling service announcements on a single EDRAM card.

FIG. 2 represents the equipment requirements for multiple calling services implemented according to the present invention. Again, using Northern Telecom's equipment as an example, announcements for multiple calling services can be provided with a single NT 1×80AA EDRAM card 20 occupying a single slot in a maintenance trunk module shelf 14.

The NT 1×80AA EDRAM card 20 contains dynamic random access memory that stores the announcement data such as phrases, tones and periods of silence. Again, as provided by the equipment vendor in a conventional manner, the announcement data resides in pre-recorded speech files. The present invention is an improved method of implementing calling service announcements on a single circuit card, such as a NT 1×80AA EDRAM card.

In order to provide multiple calling services on a single NT1×80AA card, the desired calling services must first be determined. Once the calling services are identified, the announcement fragments necessary to generate announcements regarding the desired calling service can be identified and prepared.

In one embodiment of the present inventive method, ACB and ERD were selected to be provided on a single NT1×80AA card. This is shown in the flow diagram of FIG. 3, as block 30. The first step requires an examination of the speech files offered by Northern Telecom as EPROM cards 12. These EPROM cards 12 provide the basis for constructing announcements offering the desired calling services of ACB and ERD. For example, the announcement fragments of one speech file contained in the NT1×76AJ EPROM card are shown in Table 1:

| Phrase ID | Duration: Seconds | Total Duration: Seconds | Content |
|---|---|---|---|
| 000 | 1.024 | 1.024 | (one second silence) |
| 001 | 0.160 | 0.160 | test tone: 750 Hz tone |
| 002 | 0.512 | | Prompt tone: silence |
| | 0.096 | | 750 Hz tone |
| | 0.032 | | silence |
| | 0.096 | | 750 Hz tone |
| | 0.032 | | silence |
| | 0.096 | | 750 Hz tone |
| | 0.128 | 0.992 | silence |
| 003 | 0.256 | 0.256 | 1/4 second silence |
| 004 | 6.208 | 6.272 | "We're sorry, the number cannot be reached now by this method. Please hang up and try again later." |
| 005 | 7.680 | 7.74 | "The last number that called your line cannot be given out. If you want to call this number, enter 1; |

-continued

| Phrase ID | Duration: Seconds | Total Duration: Seconds | Content |
|---|---|---|---|
| 006 | 7.488 | 7.552 | otherwise, hang up now." "We're sorry, the last number that called cannot be reached by this method. Please hang up now and call the number directly." |
| 007 | 2.848 | | "The last call to your telephone |
| | 4.960 | | cannot be traced. Please consult |
| | 1.120 | 9.952 | the introductory pages of your telephone directory for further instructions. Please hang up now." |

Figure 3:
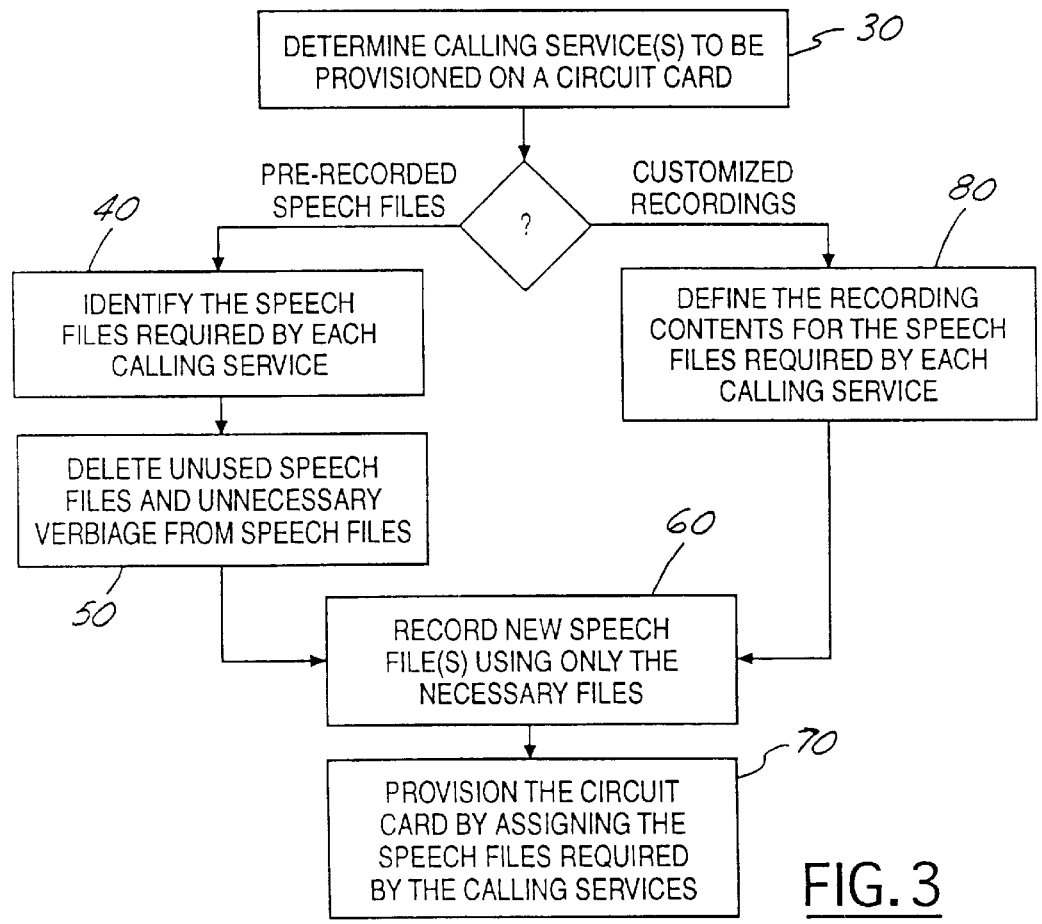

From the available announcement fragments, a complete announcement can be constructed for ACB and ERD by identifying the data necessary to present the desired calling feature to a potential user. This is shown in FIG. 3 as block 40. Complete announcements are constructed by assigning address locations for each Phrase ID to enable the controller to select and process the announcement data to generate a complete announcement.

Once all of the necessary announcement fragments for ACB and ERD are identified, the remaining fragments in the speech files can be discarded. For example, a review of the available announcement fragments identified in Table 1 reveals that Phrase ID 007 does not relate to either ACB or ERD. Accordingly, Phrase ID 007 would be one announcement fragment to be eliminated from the speech files, as shown in block 50.

Thus, in the case of Northern Telecom's equipment, portions of the four speech files in EPROM cards 12 are necessary to support ACB and ERD, and the remaining announcement data within the four speech files can be eliminated. The portions of the four speech files in EPROM cards 12 necessary to support ACB and ERD can then be combined into a single set of speech files as shown in block 60.

Once the desired announcement fragments are recorded and stored on a single NT1×80AA EDRAM card, the announcements for ACB and ERD are constructed by assigning address locations for each announcement fragment, as shown in block 70. These assignments enable the controller to select and process the announcement data to generate a complete announcement.

Assignments are made on the NT 1×80AA EDRAM card using the DRAMREC command. The following is an example of the assign format for the NT 1×80AA:

| DRAMREC | | | | | |
|---|---|---|---|---|---|
| ASSIGN | 4 | SILENCE | 2 | 2 | 3 |
| ASSIGN | 4 | CLASSENG2 | 8 | 2 | 11 |
| ASSIGN | 4 | CLASSENG7 | 3 | 2 | 9 |
| . | | | | | |
| . | | | | | |
| . | | | | | |
| ASSIGN | 4 | ENGJANUARY | 1 | 5 | 57 |
| ASSIGN | 4 | ENGFEBRUARY | 1 | 5 | 58 |
| . | | | | | |
| . | | | | | |
| . | | | | | |
| ASSIGN | 4 | ENGNUM08 | 1 | 5 | 33 |
| ASSIGN | 4 | ENGNUM09 | 1 | 5 | 34 |
| ASSIGN | 4 | ENGAT | 1 | 5 | 35 |
| ASSIGN | 4 | ENGAM | 1 | 5 | 36 |
| ASSIGN | 4 | ENGPM | 1 | 5 | 37 |
| ASSIGN | 6 | BUSY2 | 2 | 0 | 4 |

-continued

| ASSIGN | 6 | AM01  | 2 | 0 | 5  |
|--------|---|-------|---|---|----|
| ASSIGN | 6 | AM02  | 2 | 0 | 6  |
| ASSIGN | 6 | AM03  | 2 | 0 | 7  |
| ASSIGN | 6 | AM04  | 2 | 0 | 8  |
| ASSIGN | 6 | AM05  | 2 | 0 | 9  |
| ASSIGN | 6 | BUSY1 | 2 | 0 | 10 |
| QUIT   |   |       |   |   |    |

In the example format, the columns represent the assignment, DRAM position #, phrase name, phrase length in seconds, block number and phrase ID, respectively. Thus, the phrase name SILENCE may represent 0.25 seconds of silence, and the phrase names ENGAM and ENGPM represent the speech fragment for the phrases "a.m." and "p.m.", respectively. Other phrases would be assigned for the days of the week and months of the year while numbers could be assigned for minutes, seconds and telephone numbers. Finally, speech fragments could be assigned for ACB and ERD. The speech fragments for ACB are contained in the CLASSENG files and the speech fragments for ERD are contained in the AMO files.

Because the speech data on the NT 1x80AA EDRAM card can be re-recorded, multiple calling services such as ACB and ERD could also be implemented on a customized single EDRAM card without regard to the existing speech files prerecorded by Northern Telecom. Thus, desired announcement fragments can be created and recorded on a single NT 1x80AA EDRAM card. This is shown in block 80. The same calling services would be provided as before. Specifically, address assignments for each announcement fragment would be made to enable the controller to generate a complete announcement.

From the foregoing, it will be seen that the new and improved method of provisioning multiple calling services on a single EDRAM overcomes the drawbacks associated with prior implementations of multiple calling service announcements. In particular, the described method greatly reduces the equipment necessary to implement such multiple calling service announcements.

While the invention will be described in connection with one or more embodiments, it will be understood that the invention is not limited to those embodiments. On the contrary, the invention includes all alternatives, modifications, and equivalents as may be included within the spirit and scope of the appended claims.

What is claimed is:

1. A method of providing more than one communication service on a single circuit card comprising the steps of:
    defining a first group of audio segments necessary to compose a complete announcement of a first communication service;
    defining a second group of audio segments necessary to compose a complete announcement of a second communication service;
    storing, on a single circuit card, a third group of audio segments comprising audio segments unique to respective said first and second group of audio segments and audio segments common to said first and second group of audio segments; and
    programming said circuit card to deliver, in response to a user selection of either said first or second communication service, a complete announcement for said respective service composed from said third group of audio segments.

2. The method of claim 1 wherein said first communication service is Automatic Call Back.

3. The method of claim 2 wherein said second communication service is Enhanced Repeat Dial.

4. The method of claim 3 wherein said circuit card is a NT1x80AA EDRAM card.

5. A method of providing more than one communication service on a single circuit card comprising the steps of:
    defining, from a first group of audio segments, a first subset of audio segments necessary to compose a first announcement of a first communication service;
    defining, from said first group of audio segments, a second subset of audio segments necessary to compose a second announcement of a second communication service;
    storing only said first and second subsets of audio segments on a single circuit card;
    programming said circuit card to deliver, in response to a user selection of either said first or second communication service, a complete announcement for said respective service composed from said stored audio segments.

6. The method of claim 5 wherein said first communication service is Automatic Call Back.

7. The method of claim 6 wherein said second communication service is Enhanced Repeat Dial.

8. The method of claim 7 wherein said circuit card is a NT1x80AA EDRAM card.

9. A communication service announcement delivery system comprising:
    a circuit card comprising a digital memory array constructed to receive and store audio segments in digitized form;
    a first group of audio segments stored on said circuit card uniquely associated with a first announcement of a first communication service;
    a second group of audio segments stored on said circuit card uniquely associated with a second announcement of a second communication service;
    a third group of audio segments stored on said circuit card commonly associated with said first and second announcements; and
    means for delivering, in response to a user selection of either said first or second communication service, a complete announcement for said respective service composed from said respective first or second group of audio segments and said third group of audio segments.

10. The apparatus of claim 9 wherein said first communication service is Automatic Call Back.

11. The apparatus of claim 10 wherein said second communication service is Enhanced Repeat Dial.

12. The apparatus of claim 11 wherein said circuit card is a NT1x80AA EDRAM card.

* * * * *